United States Patent
Copperthite et al.

(10) Patent No.: US 11,958,124 B2
(45) Date of Patent: *Apr. 16, 2024

(54) ULTRASONIC WELDING SYSTEMS AND METHODS OF USING THE SAME

(71) Applicant: Kulicke and Soffa Industries, Inc., Fort Washington, PA (US)

(72) Inventors: Theodore J. Copperthite, Laguna Hills, CA (US); Hans H. Von Tresckow, Oceanside, CA (US); Christopher R. Longley, Mission Viejo, CA (US); Siddharth D. Kataria, Irvine, CA (US)

(73) Assignee: Kulicke and Soffa Industries, Inc., Fort Washington, PA (US)

( * ) Notice: Subject to any disclaimer, the term of this patent is extended or adjusted under 35 U.S.C. 154(b) by 49 days.

This patent is subject to a terminal disclaimer.

(21) Appl. No.: 17/969,028

(22) Filed: Oct. 19, 2022

(65) Prior Publication Data

US 2023/0043068 A1 Feb. 9, 2023

Related U.S. Application Data

(60) Continuation of application No. 17/586,105, filed on Jan. 27, 2022, now Pat. No. 11,504,800, which is a
(Continued)

(51) Int. Cl.
*B23K 20/00* (2006.01)
*B23K 20/10* (2006.01)
*B23K 101/32* (2006.01)

(52) U.S. Cl.
CPC ........ *B23K 20/106* (2013.01); *B23K 2101/32* (2018.08)

(58) Field of Classification Search
CPC .......... H01L 2224/85205; B23K 20/10; B23K 20/002; B23K 20/004; B23K 20/005; B23K 20/103; B23K 20/106; B23K 37/04
See application file for complete search history.

(56) References Cited

U.S. PATENT DOCUMENTS 8,858,742 B2  10/2014 Spicer et al.
9,751,257 B2 * 9/2017 Li ........................... B29C 65/08
(Continued)

FOREIGN PATENT DOCUMENTS

CN  103817427  5/2014
JP  2007-005474  1/2007
(Continued)

OTHER PUBLICATIONS

International Search Report dated Mar. 19, 2020 for International Patent Application No. PCT/US2019/063007.

*Primary Examiner* — Erin B Saad
(74) *Attorney, Agent, or Firm* — Christopher M. Spletzer, Sr.

(57) ABSTRACT

An ultrasonic welding system is provided. The ultrasonic welding system includes a support structure for supporting a workpiece. The ultrasonic welding system also includes a weld head assembly including an ultrasonic converter carrying a sonotrode. The ultrasonic welding system also includes a z-axis motion system carrying the weld head assembly. The z-axis motion system includes (i) a z-axis forcer for moving the weld head assembly along a z-axis of the ultrasonic welding system, and (ii) a z-axis overtravel mechanism disposed between the z-axis forcer and the weld head assembly.

21 Claims, 12 Drawing Sheets

Related U.S. Application Data division of application No. 16/697,010, filed on Nov. 26, 2019, now Pat. No. 11,285,561.

(60) Provisional application No. 62/772,113, filed on Nov. 28, 2018.

(56) References Cited

U.S. PATENT DOCUMENTS

| | | | |
|---|---|---|---|
| 10,096,570 B2 | 10/2018 | Yoneda et al. | |
| 10,118,246 B2* | 11/2018 | Hayata | H01L 24/85 |
| 2004/0211812 A1* | 10/2004 | Hizukuri | H01L 24/75 |
| | | | 228/1.1 |
| 2006/0169388 A1 | 8/2006 | Shimizu et al. | |
| 2006/0255091 A1* | 11/2006 | Reatherford | B23K 20/10 |
| | | | 228/1.1 |
| 2008/0265004 A1 | 10/2008 | Stroh | |
| 2009/0031558 A1 | 2/2009 | Mizuno et al. | |
| 2009/0255979 A1 | 10/2009 | Saito et al. | |
| 2009/0289098 A1* | 11/2009 | Terada | H01L 24/75 |
| | | | 228/102 |
| 2011/0036897 A1* | 2/2011 | Nakai | B06B 3/00 |
| | | | 228/1.1 |
| 2012/0285626 A1* | 11/2012 | Solano | B29C 65/7805 |
| | | | 156/580.1 |
| 2013/0049201 A1 | 2/2013 | Yoshida et al. | |
| 2013/0112735 A1 | 5/2013 | Luechinger et al. | |
| 2013/0181037 A1* | 7/2013 | Nagai | H05K 13/0465 |
| | | | 228/103 |
| 2014/0048584 A1* | 2/2014 | Luechinger | B23K 20/10 |
| | | | 228/110.1 |
| 2014/0175159 A1* | 6/2014 | Kostner | H01L 24/75 |
| | | | 228/103 |
| 2014/0209663 A1* | 7/2014 | Song | H01L 24/78 |
| | | | 228/1.1 |
| 2015/0210003 A1 | 7/2015 | Short et al. | |
| 2015/0243627 A1* | 8/2015 | Akiyama | H01L 24/85 |
| | | | 228/102 |
| 2015/0274337 A1* | 10/2015 | Beauvy | B29C 66/8145 |
| | | | 156/73.4 |
| 2016/0052194 A1* | 2/2016 | Nakai | B29C 66/8223 |
| | | | 228/1.1 |
| 2016/0133712 A1 | 5/2016 | Yoneda et al. | |
| 2021/0114309 A1* | 4/2021 | Beach | B29C 66/8145 |

FOREIGN PATENT DOCUMENTS

| | | |
|---|---|---|
| JP | 2013063521 | 4/2013 |
| JP | 2014-056917 | 3/2014 |
| JP | 2017-024040 | 2/2017 |
| KR | 10-1276408 | 6/2013 |
| WO | 2013103191 | 7/2013 |
| WO | WO2016-199621 | 12/2016 |
| WO | WO2018/187364 | 10/2018 |
| WO | WO2019/075289 | 4/2019 |

* cited by examiner

ULTRASONIC WELDING SYSTEMS AND METHODS OF USING THE SAME

CROSS-REFERENCE TO RELATED APPLICATION

This application is a continuation application of U.S. patent application Ser. No. 17/586,105, filed Jan. 7, 2022, which is a divisional application of U.S. patent application Ser. No. 16/697,010, filed Nov. 26, 2019, which issued as U.S. Pat. No. 11,285,561, which claims the benefit of U.S. Provisional Application No. 62/772,113, filed Nov. 28, 2018, the contents of all of which are incorporated herein by reference.

FIELD

The invention relates to the ultrasonic welding systems, and more particularly, to improved systems and methods for performing ultrasonic welding operations.

BACKGROUND

Ultrasonic energy is widely used in forming interconnections between two or more materials. For examples, wire bonding machines (e.g., ball bonding machines, wedge bonding machines, ribbon bonding machines, etc.) are used to bond a wire or ribbon to a bonding location. However, wire bonding utilizes relatively low levels of energy (e.g., bond force, ultrasonic energy, etc.). Exemplary wire bonding machines are marketed by Kulicke and Soffa Industries, Inc. of Fort Washington, Pennsylvania.

Certain applications involve joining of materials other than wire. Welding has been considered for such applications. Ultrasonic welding is also a widely used technology. Ultrasonic welding may use an ultrasonic converter (e.g., carrying a sonotrode) for converting electrical energy into mechanical movement/scrub (e.g., linear movement/scrub, torsional movement/scrub, etc.). However, existing ultrasonic welding technology and equipment is limited in its ability to provide solutions that can satisfy market demand in terms of cost, operational efficiency, flexibility, portability, and related factors.

Thus, it would be desirable to improve ultrasonic welding technology to overcome existing barriers to potential markets.

SUMMARY

According to an exemplary embodiment of the invention, an ultrasonic welding system is provided. The ultrasonic welding system includes a support structure for supporting a workpiece. The ultrasonic welding system also includes a weld head assembly including an ultrasonic converter carrying a sonotrode. The ultrasonic welding system also includes a z-axis motion system carrying the weld head assembly. The z-axis motion system includes (i) a z-axis forcer for moving the weld head assembly along a z-axis of the ultrasonic welding system, and (ii) a z-axis overtravel mechanism disposed between the z-axis forcer and the weld head assembly.

According to yet another exemplary embodiment of the invention, an ultrasonic welding system is provided. The ultrasonic welding system includes a support structure for supporting a workpiece. The ultrasonic welding system also includes a weld head assembly including an ultrasonic converter carrying a sonotrode. The ultrasonic welding system further includes a z-axis motion system carrying the weld head assembly. The z-axis motion system includes (i) a z-axis forcer for moving the weld head assembly along a z-axis of the ultrasonic welding system, the z-axis forcer including a ball screw system for moving the weld head assembly along the z-axis of the ultrasonic welding system, and (ii) a z-axis overtravel mechanism disposed between the z-axis forcer and the weld head assembly, the z-axis overtravel mechanism including an inline spring. The ultrasonic welding system further includes: (a) a z-axis encoder for sensing motion of (i) a moveable portion of the z-axis forcer with respect to (ii) a stationary portion of the z-axis forcer along the z-axis of the ultrasonic welding system; and (b) an overtravel encoder for sensing motion of (i) the moveable portion of the z-axis forcer with respect to (ii) the weld head assembly along the z-axis of the ultrasonic welding system.

According to yet another exemplary embodiment of the invention, a method of ultrasonically welding a conductive terminal to a workpiece is provided. The method includes the steps of: (a) supporting a workpiece on a support structure of an ultrasonic welding system, a conductive terminal being aligned with a conductive region of the workpiece; (b) providing a weld head assembly, including an ultrasonic converter carrying a sonotrode, the weld head assembly being configured for motion along a z-axis of the ultrasonic welding system using a z-axis forcer of a z-axis motion system of the ultrasonic welding system; (c) providing a z-axis overtravel mechanism disposed between the z-axis forcer and the weld head assembly, the z-axis forcer carrying the weld head assembly and the z-axis overtravel mechanism; (d) moving a moveable portion of the z-axis forcer downward along the z-axis of the ultrasonic welding system until a welding tip of the sonotrode is in contact with the conductive terminal; (e) moving the moveable portion of the z-axis forcer further downward along the z-axis of the ultrasonic welding system to activate the z-axis overtravel mechanism after step (d); and (f) applying ultrasonic energy to the welding tip of the sonotrode to weld the conductive terminal to the conductive region of the workpiece.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION

The content of International Patent Application No. PCT/US2018/025941, with a priority date of Apr. 4, 2017, is incorporated herein by reference in its entirety.

In accordance with the invention, ultrasonic welding capability is provided in welding systems (and corresponding methods) that may achieve efficient volume production. Aspects of the invention relate to ultrasonic welding systems including z-axis motion systems having (i) a z-axis forcer for moving a weld head assembly along a z-axis of the ultrasonic welding system (e.g., linear motor driven forcers, ball/screw system driven forcers, pneumatic cylinder driven forcers, etc.), and (ii) a z-axis overtravel mechanism (e.g., inline spring based overtravel mechanisms, pneumatic cylinder based overtravel mechanisms, etc.). In certain embodiments of the invention, a secondary z-axis forcer (e.g., including a pneumatic cylinder, among other variations) may be incorporated to provide a variable force along the z-axis of the ultrasonic welding system.

Exemplary electro servo motor systems (e.g., ball/screw driven systems) are controlled along the z-axis to provide large bond/weld forces (e.g., greater than 1500 N) with a drive system rated at less than 1 kW continuous. For example, a ball screw may be used to generate a gear reduction and convert to linear motion, which then controls the compression of an inline spring (e.g., a stiff inline spring) included in a z-axis overtavel mechanism which generates the actual weld forces.

In a ball screw driven system, the ball screw pushes on the inline spring to generate the desired weld/bond forces. In such a system, two position feedback sensors (e.g., a z-axis encoder and an overtravel encoder) may be utilized to combine the signals to determine the desired deformation signal during welding. The z-axis position may be dynamically controlled during welding such that the z-axis maintains substantially constant bond/weld forces during the ultrasonic welding process.

In accordance with aspects of the invention, a separate overtravel mechanism is provided to minimize impact forces during welding operations.

Further, in accordance with aspects of the invention, the z-axis motor forces are all in line with each other (and the sonotrode) to minimize shifting during bond/weld force application.

In accordance with further aspects of the invention, a secondary forcer motor may be utilized that can fine-tune the bond/weld forces applied with the primary z-axis forcer. Such an approach allows for precision force calibration plus fine force adjustment capability via the additional forcer mounted to the overtravel mechanism.

Figure 1A:
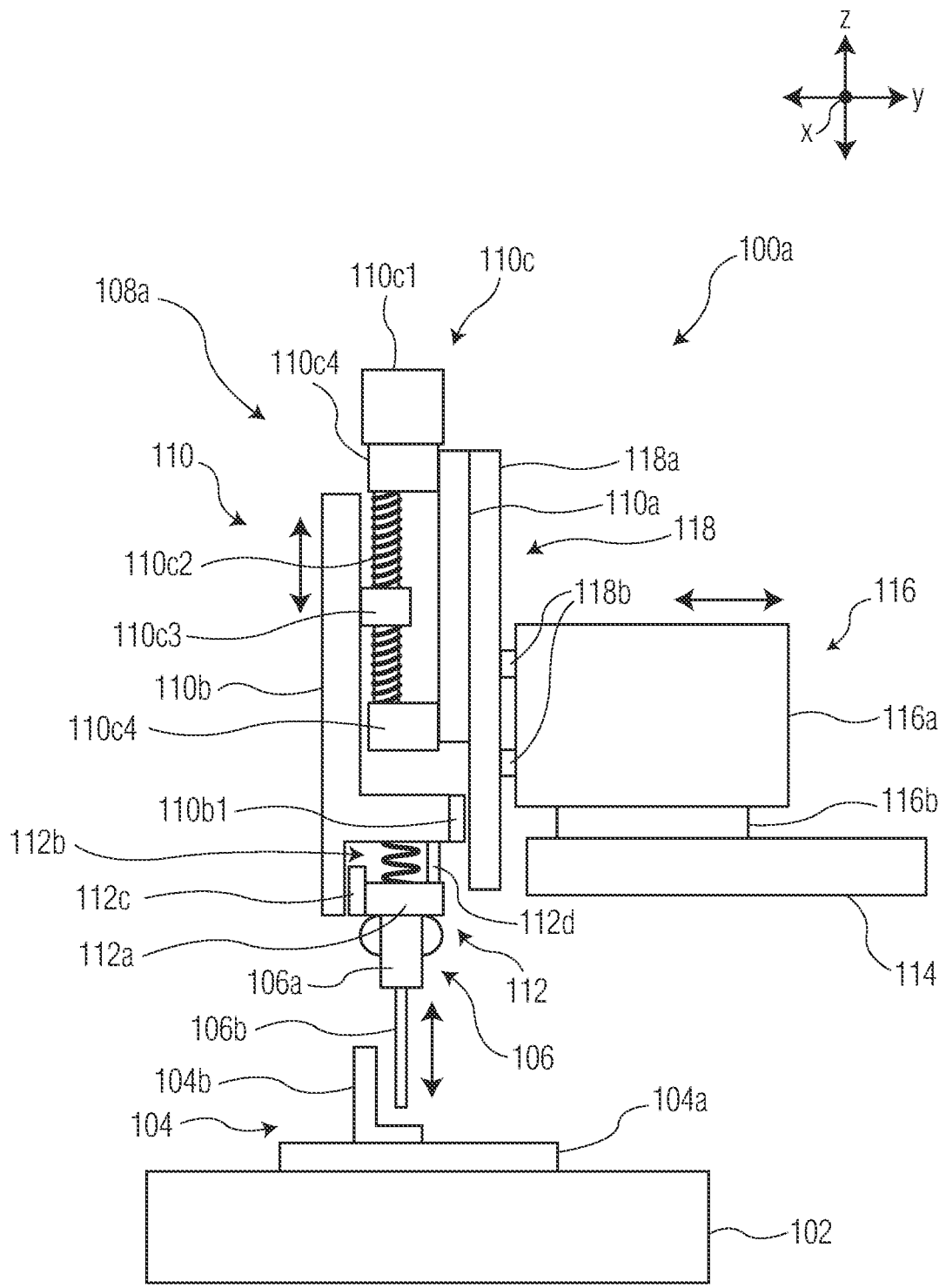
FIG. 1A is a block diagram side view of an ultrasonic welding system in accordance with an exemplary embodiment of the invention.

Referring now to the drawings, FIG. 1A illustrates an ultrasonic welding system 100a. Ultrasonic welding system 100a includes support structure 102 supporting workpiece 104. Workpiece includes a substrate 104a, and a conductive terminal 104b configured to be ultrasonically welded to a conductive region of substate 104a. Ultrasonic welding system 100a also includes weld head assembly 106 including an ultrasonic converter 106a, and a sonotrode 106b carried by ultrasonic converter 106a.

Ultrasonic welding system 100a also includes a z-axis motion system 108a carrying weld head assembly 106. Z-axis motion system 108a includes (a) a z-axis forcer 110 for moving weld head assembly 106 along a z-axis of ultrasonic welding system 100a (see example x, y, z axis legend proximate FIG. 1A), and (b) a z-axis overtravel mechanism 112 disposed between z-axis forcer 110 and weld head assembly 106. Z-axis bearings are not shown in any of these diagrams (for simplicity and clarity), but may also be in the mechanism for any implementation. Such z-axis bearings would constrain moveable portion 110b to move in the z-direction with respect to stationary portion 110a.

In FIG. 1A, z-axis forcer 110 is a ball screw driven forcer, and includes (i) a stationary portion 110a (i.e., stationary in that it does not move with the moveable portion 110b), a moveable portion 110b (including z-axis encoder 110b1), and a motion system 110c. Motion system 110c drives moveable portion 110b with respect to stationary portion 110a. Motion system 110c includes a rotary motor 110c1, a threaded shaft 110c2, a ball assembly 110c3 for moving along threaded shaft 110c2, and mounts 110c4 for mounting threaded shaft 110c2 to stationary portion 110a. As will be appreciated by those skilled in the art, rotary motor 110c1 rotates threaded shaft 110c2, thereby moving ball assembly 110c3. As ball assembly 110c3 carries moveable portion 110b, moveable portion 110b moves along with ball assembly 110c3. Of course, z-axis forcer 110 is illustrated and described herein as a simple ball screw driven forcer; however, it is understood that different screw driven forcers are contemplated.

In FIG. 1A, z-axis overtravel mechanism 112 includes (i) z-axis block 112a (coupled to weld head assembly 106, either directly or indirectly), inline spring 112b, overtravel encoder 112c, and z-axis alignment structure 112d (e.g., one or more pins, flexures, bearings, etc. providing z-axis alignment such that motion of z-axis block 112a with respect to moveable portion 110b is substantially along the z-axis (and not the x-axis or y-axis)).

Weld head assembly 106 (carried by z-axis motion system 108a) is also moveable along a plurality of substantially horizontal axes. In the example shown in FIG. 1A, weld head assembly 106 is configured to move along the x-axis and the y-axis of ultrasonic welding system 100a through the use of x-axis motion system 118 and y-axis motion system 116. More specifically, y-axis motion system 116 includes y-axis gantry 116a coupled to machine frame 114 via y-axis bearings 116b. X-axis motion system 118 is carried by y-axis motion system 116. X-axis motion system 118 includes x-axis gantry 118a coupled to y-axis gantry 116a via x-axis bearings 118b. Stationary portion 110a is coupled to x-axis gantry 118a. It is noteworthy that for all implementations of the invention, stationary portion 110a may be part of the same element/structure as x-axis gantry 118a; however, they are illustrated as separate elements conceptually.

Thus, in the example ultrasonic welding system 100a shown in FIG. 1A (and the other exemplary welding systems illustrated and described herein), the x-axis motion system is carried by the y-axis motion system, and the z-axis motion system (and the weld head assembly) is carried by the x-axis motion system. Of course, changes to these configurations are contemplated. For example, the y-axis motion system may be carried by the x-axis motion system, and the z-axis motion system (and the weld head assembly) is carried by the y-axis motion system.

Figure 1B:
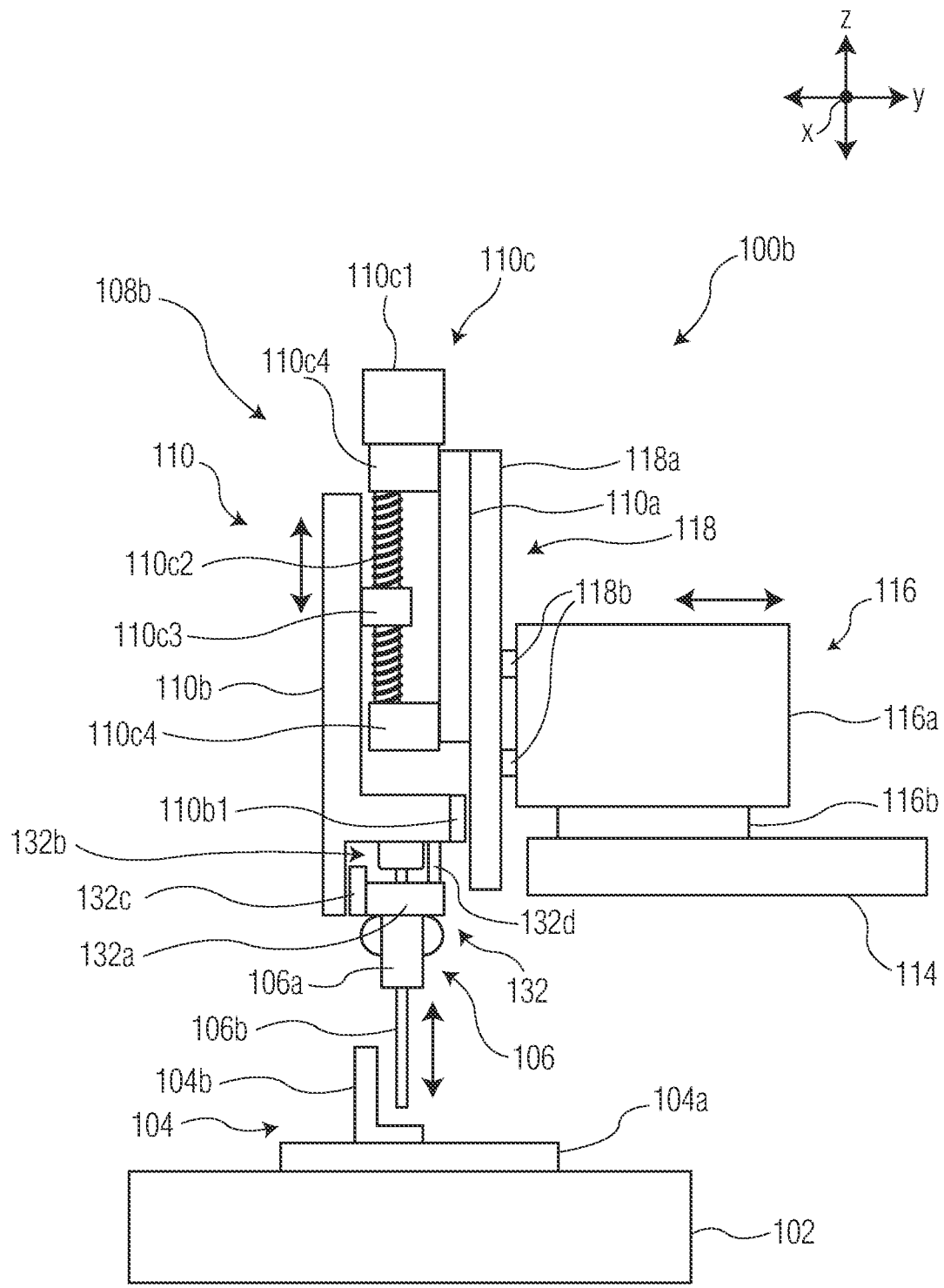
FIG. 1B is a block diagram side view of another ultrasonic welding system in accordance with an exemplary embodiment of the invention.

FIG. 1B illustrates an ultrasonic welding system 100b. Ultrasonic welding system 100b includes a number of identical components/elements as compared to ultrasonic welding system 100a (illustrated and described with respect to FIG. 1A), including, for example: support structure 102, workpiece 104, weld head assembly 106, z-axis forcer 110, machine frame 114, y-axis motion system 116, and x-axis motion system 118. Thus, certain details of such components/elements are not repeated with respect to FIG. 1B.

Ultrasonic welding system 100b (of FIG. 1B) differs from ultrasonic welding system 100a (of FIG. 1A) in that z-axis overtravel mechanism 132 (of FIG. 1B) replaces z-axis overtravel mechanism 112 (of FIG. 1A). Z-axis overtravel mechanism 132, along with z-axis forcer 110, is part of z-axis motion system 108b of ultrasonic welding system 100b. Z-axis overtravel mechanism 132 includes (i) z-axis block 132a (coupled to weld head assembly 106, either directly or indirectly), pneumatic cylinder 132b, overtravel encoder 132c, and z-axis alignment structure 132d (e.g., one or more pins, flexures, bearings, etc. providing z-axis alignment such that motion of z-axis block 112a with respect to moveable portion 110b is substantially along the z-axis (and not the x-axis or y-axis)).

Figure 2A:
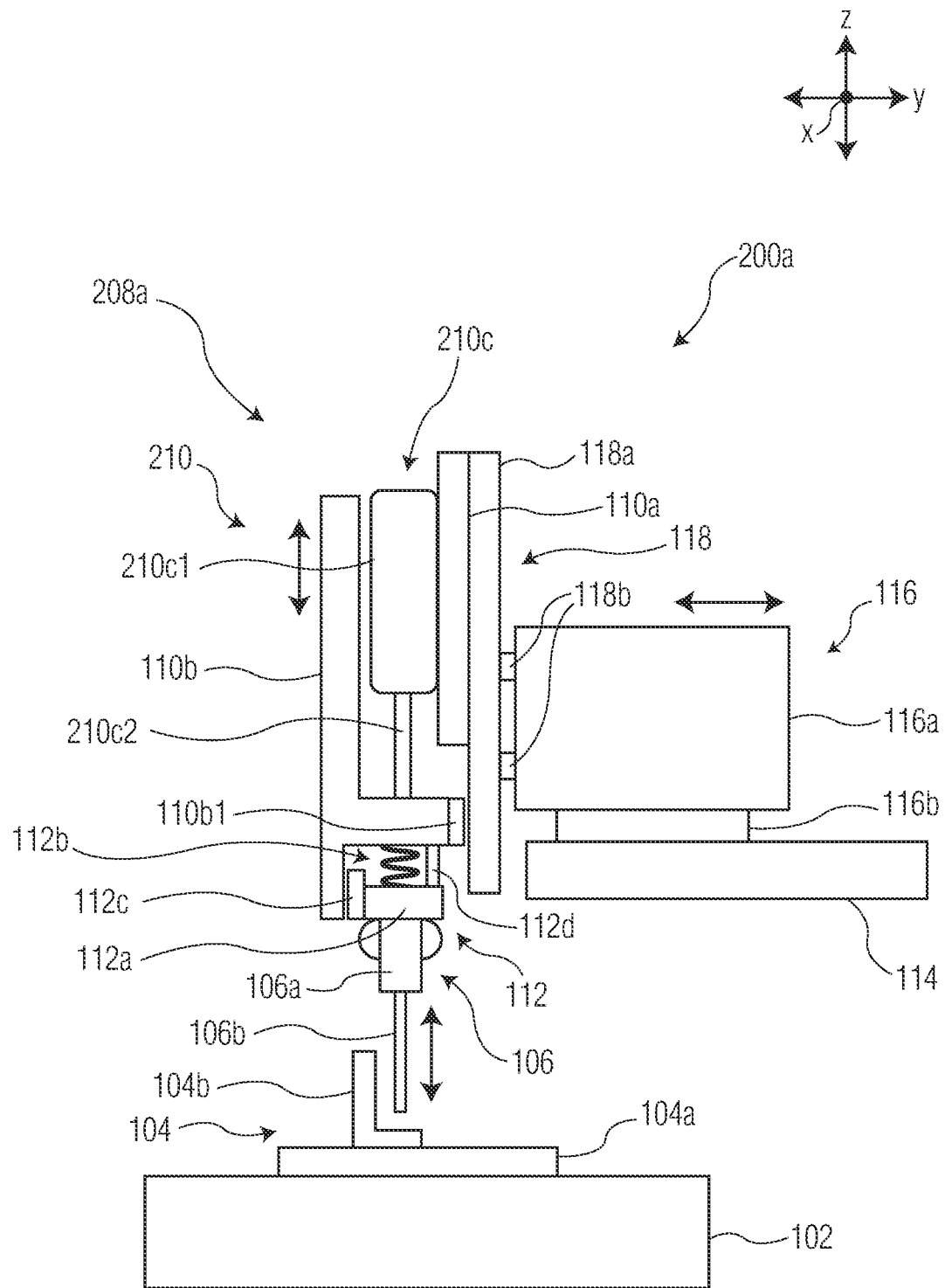
FIG. 2A is a block diagram side view of yet another ultrasonic welding system in accordance with an exemplary embodiment of the invention.

FIG. 2A illustrates an ultrasonic welding system 200a. Ultrasonic welding system 200a includes a number of identical components/elements as compared to ultrasonic welding system 100a (illustrated and described with respect to FIG. 1A), including, for example: support structure 102, workpiece 104, weld head assembly 106, certain elements of z-axis forcer 110 (i.e., stationary portion 110a, moveable portion 110b), z-axis overtravel mechanism 112, machine frame 114, y-axis motion system 116, and x-axis motion system 118. Thus, certain details of such components/elements are not repeated with respect to FIG. 2A.

Ultrasonic welding system 200a (of FIG. 2A) differs from ultrasonic welding system 100a (of FIG. 1A) in that z-axis motion system 210c of z-axis forcer 210 (of FIG. 2A) replaces z-axis motion system 110c of z-axis forcer 110 (of FIG. 1A). Z-axis motion system 210c is part of z-axis forcer 210, which is part of z-axis motion system 208a of ultrasonic welding system 200a. Z-axis motion system 210c includes pneumatic cylinder 210c1 (coupled to stationary portion 110a, either directly or indirectly), and piston rod 210c2 (coupled to a piston in pneumatic cylinder 210c1, not shown for simplicity, and coupled to moveable portion 110b, either directly or indirectly). Because piston rod 210c2 carries moveable portion 110b, moveable portion 110b moves along with piston rod 210c2.

Figure 2B:
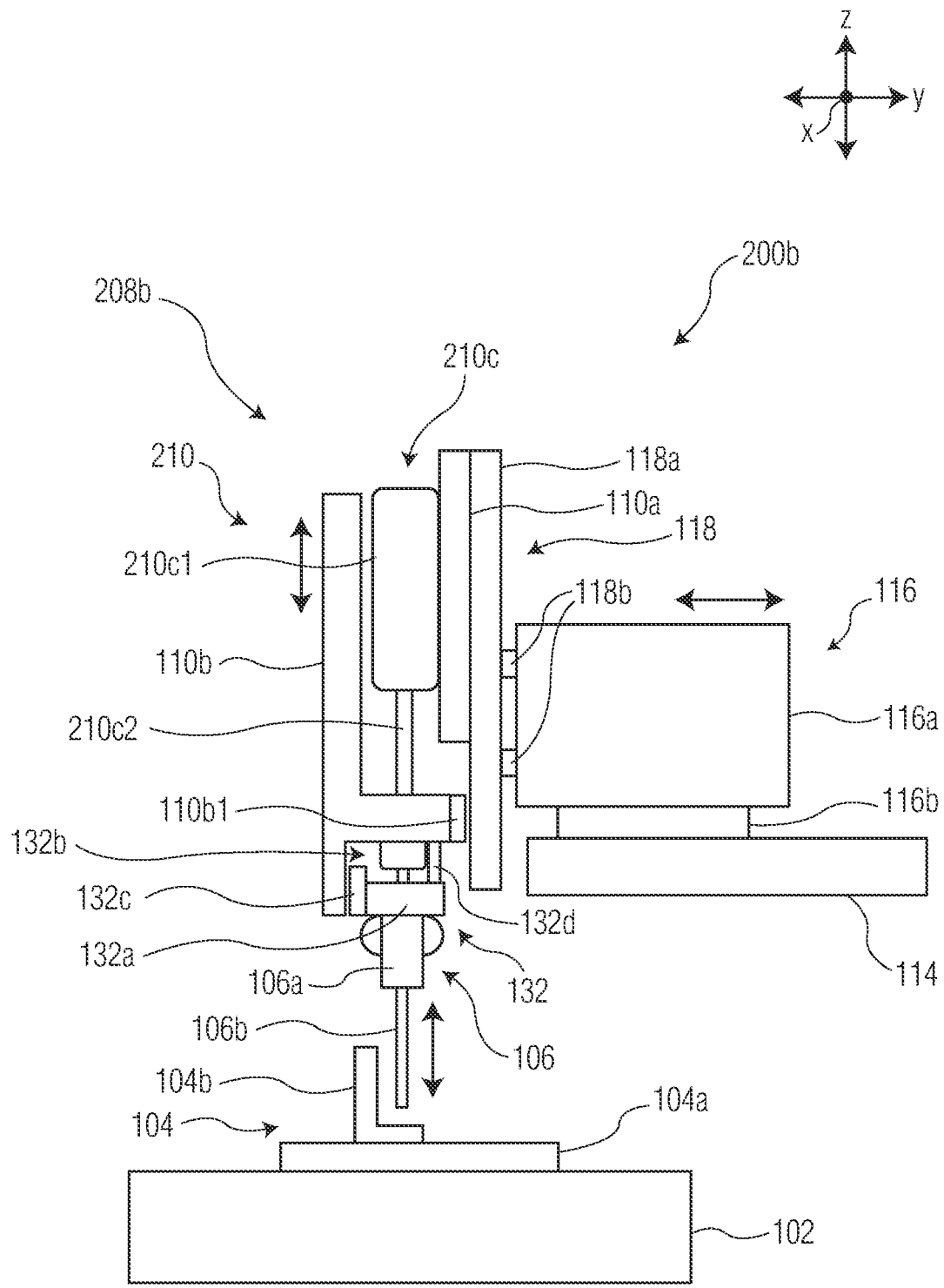
FIG. 2B is a block diagram side view of yet another ultrasonic welding system in accordance with an exemplary embodiment of the invention.

FIG. 2B illustrates an ultrasonic welding system 200b. Ultrasonic welding system 200b includes a number of identical components/elements as compared to respective ultrasonic welding systems 100a, 100b, 200a (illustrated and described with respect to FIGS. 1A, 1B and 2A), including, for example: support structure 102, workpiece 104, weld head assembly 106, z-axis forcer 210, z-axis motion system 210c, machine frame 114, y-axis motion system 116, and x-axis motion system 118. Thus, certain details of such components/elements are not repeated with respect to FIG. 2B.

Ultrasonic welding system 200b (of FIG. 2B) differs from ultrasonic welding system 200a (of FIG. 2A) in that z-axis overtravel mechanism 132 (of FIG. 2B, previously described with respect to FIG. 1B) replaces z-axis overtravel mechanism 112 (of FIG. 2A). Z-axis overtravel mechanism 132, along with z-axis forcer 210, is part of z-axis motion system 208b of ultrasonic welding system 200b. Z-axis overtravel mechanism 132 includes (i) z-axis block 132a (coupled to weld head assembly 106, either directly or indirectly), pneumatic cylinder 132b, overtravel encoder 132c, and z-axis alignment structure 132d (e.g., one or more pins, flexures, bearings, etc. providing z-axis alignment such that motion of z-axis block 132a with respect to moveable portion 110b is substantially along the z-axis (and not the x-axis or y-axis)).

Figure 3A:
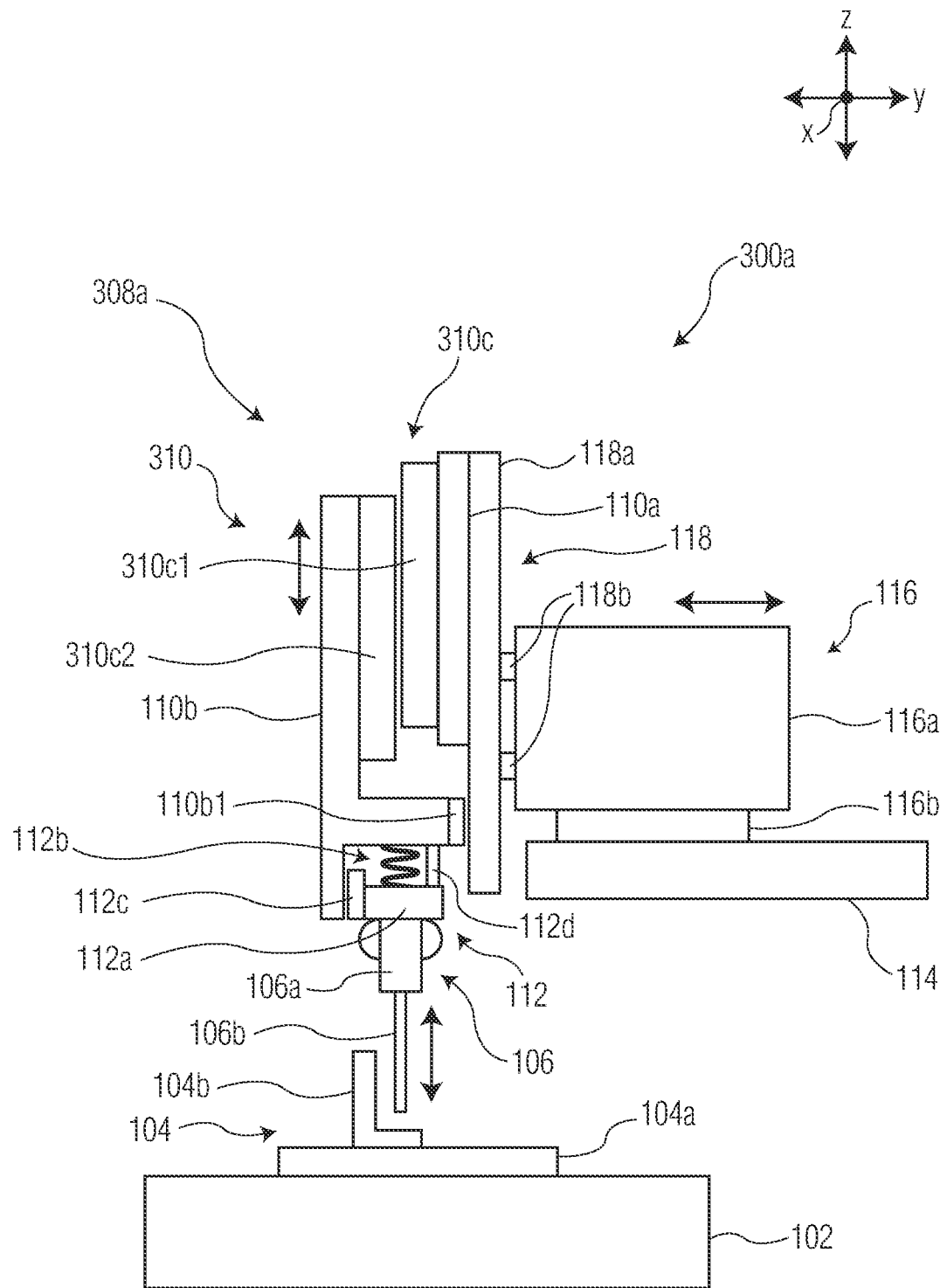
FIG. 3A is a block diagram side view of yet another ultrasonic welding system in accordance with an exemplary embodiment of the invention.

FIG. 3A illustrates an ultrasonic welding system 300a. Ultrasonic welding system 300a includes a number of identical components/elements as compared to ultrasonic welding system 100a (illustrated and described with respect to FIG. 1A), including, for example: support structure 102, workpiece 104, weld head assembly 106, certain elements of z-axis forcer 110 (i.e., stationary portion 110a, moveable portion 110b), z-axis overtravel mechanism 112, machine frame 114, y-axis motion system 116, and x-axis motion system 118. Thus, certain details of such components/elements are not repeated with respect to FIG. 3A.

Ultrasonic welding system 300a (of FIG. 3A) differs from ultrasonic welding system 100a (of FIG. 1A) in that linear motor 310c of z-axis forcer 310 (of FIG. 3A) replaces z-axis motion system 110c of z-axis forcer 110 (of FIG. 1A). Linear motor 310c is part of z-axis forcer 310, which is part of z-axis motion system 308a of ultrasonic welding system 300a. Linear motor 310c includes stationary portion 310c1 (coupled to stationary portion 110a, either directly or indirectly), and moveable portion 310c2 (coupled to a moveable portion 110b, either directly or indirectly). As moveable portion 310c2 carries moveable portion 110b, moveable portion 110b moves along with moveable portion 310c2.

Figure 3B:
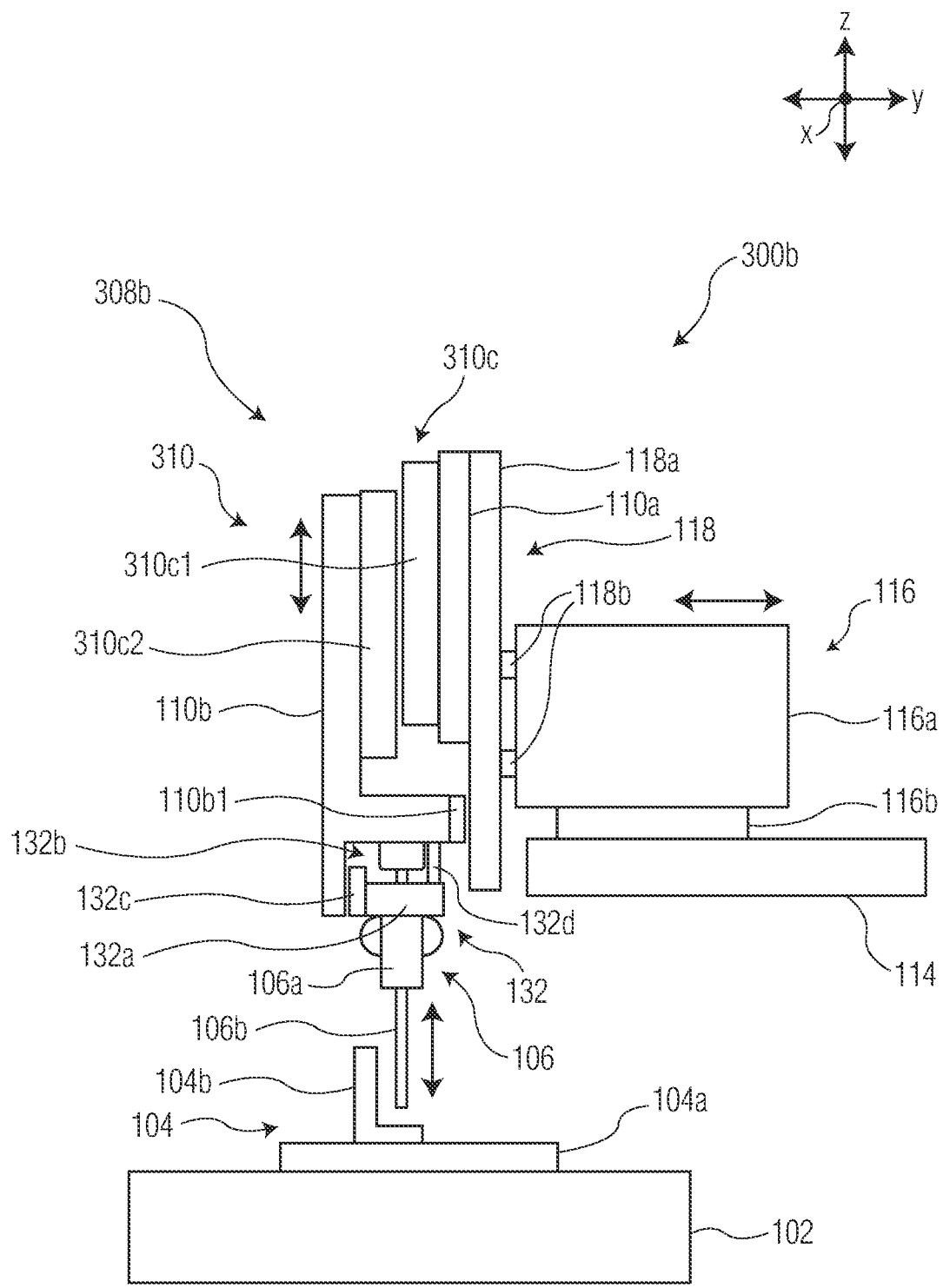
FIG. 3B is a block diagram side view of yet another ultrasonic welding system in accordance with an exemplary embodiment of the invention.

FIG. 3B illustrates an ultrasonic welding system 300b. Ultrasonic welding system 300b includes a number of identical components/elements as compared to respective ultrasonic welding systems 100a, 100b, 300a (illustrated and described with respect to FIGS. 1A, 1B, and 3A), including, for example: support structure 102, workpiece 104, weld head assembly 106, z-axis forcer 310, linear motor 310c, machine frame 114, y-axis motion system 116, and x-axis motion system 118. Thus, certain details of such components/elements are not repeated with respect to FIG. 3B.

Ultrasonic welding system 300b (of FIG. 3B) differs from ultrasonic welding system 300a (of FIG. 3A) in that z-axis overtravel mechanism 132 (of FIG. 3B) replaces z-axis overtravel mechanism 112 (of FIG. 3A). Z-axis overtravel mechanism 132, along with z-axis forcer 310, is part of z-axis motion system 308b of ultrasonic welding system 300b. Z-axis overtravel mechanism 132 includes (i) z-axis block 132a (coupled to weld head assembly 106, either directly or indirectly), pneumatic cylinder 132b, overtravel encoder 132c, and z-axis alignment structure 132d (e.g., one or more pins, flexures, bearings, etc. providing z-axis alignment such that motion of z-axis block 112a with respect to moveable portion 110b is substantially along the z-axis (and not the x-axis or y-axis)).

Figure 4:
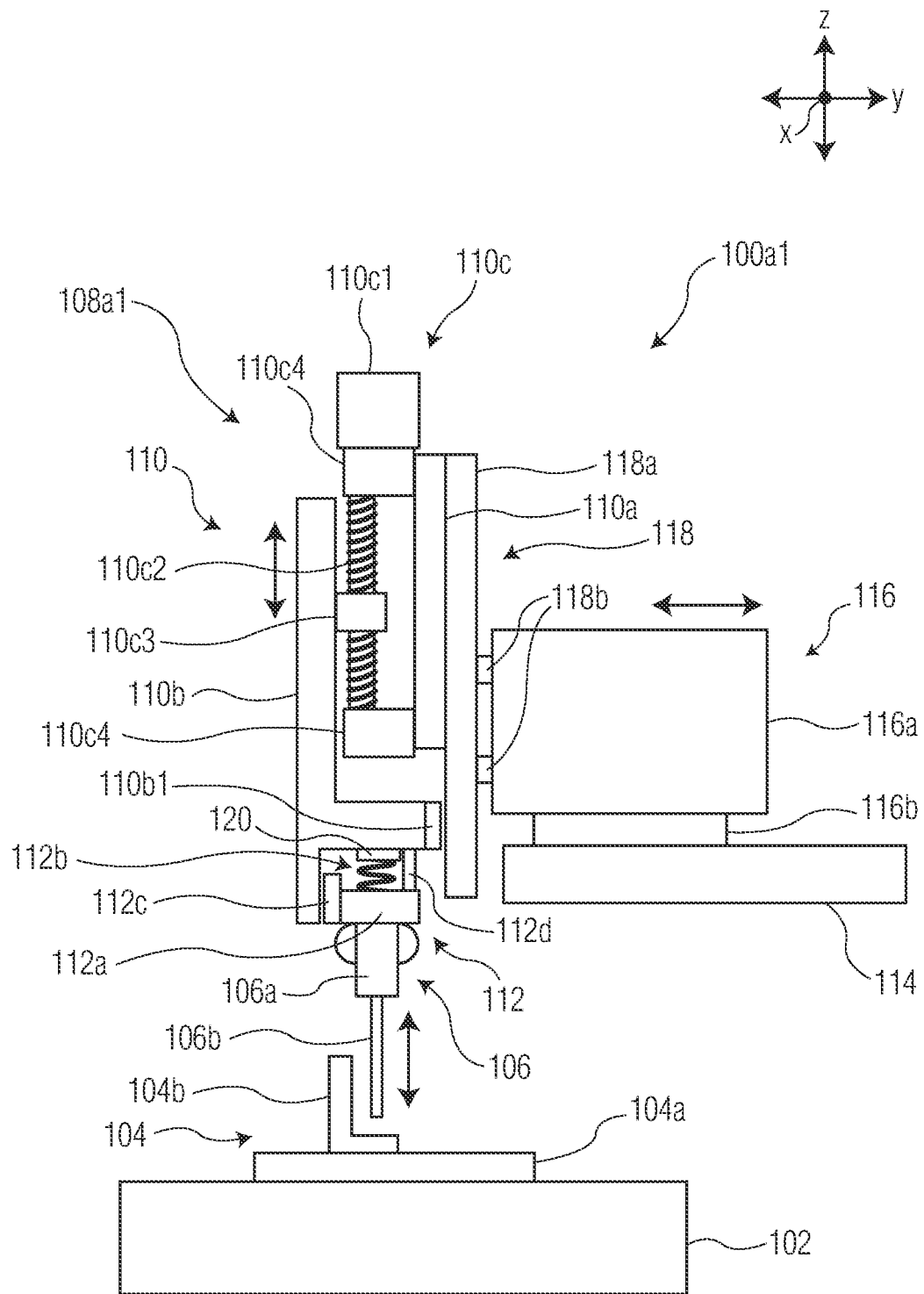
FIG. 4 is a block diagram side view of yet another ultrasonic welding system in accordance with an exemplary embodiment of the invention.

FIG. 4 illustrates an ultrasonic welding system 100a1. Ultrasonic welding system 100a1 is substantially similar to ultrasonic welding system 100a (illustrated and described with respect to FIG. 1A), and includes a number of identical components/elements as compared to ultrasonic welding system 100a. Thus, certain details of such components/elements are not repeated with respect to FIG. 4.

Ultrasonic welding system 100*a*1 (of FIG. 4) differs from ultrasonic welding system 100*a* (of FIG. 1A) in that z-axis motion system 108*a*1 (of FIG. 4) includes a force detection mechanism 120 (e.g., a load cell 120) for detecting a z-axis force applied by ultrasonic welding system 100*a*1 along the z-axis of ultrasonic welding system 100*a*1. In FIG. 4, force detection mechanism 120 is positioned between inline spring 112*b* and moveable portion 110*b*. Alternative positions for force detection mechanism 120 are contemplated, for example: between inline spring 112*b* and z-axis block 112*a*; between z-axis block 112*a* and ultrasonic converter 106*a*, among other positions—so long as the force measurement may be accomplished.

Figure 5:
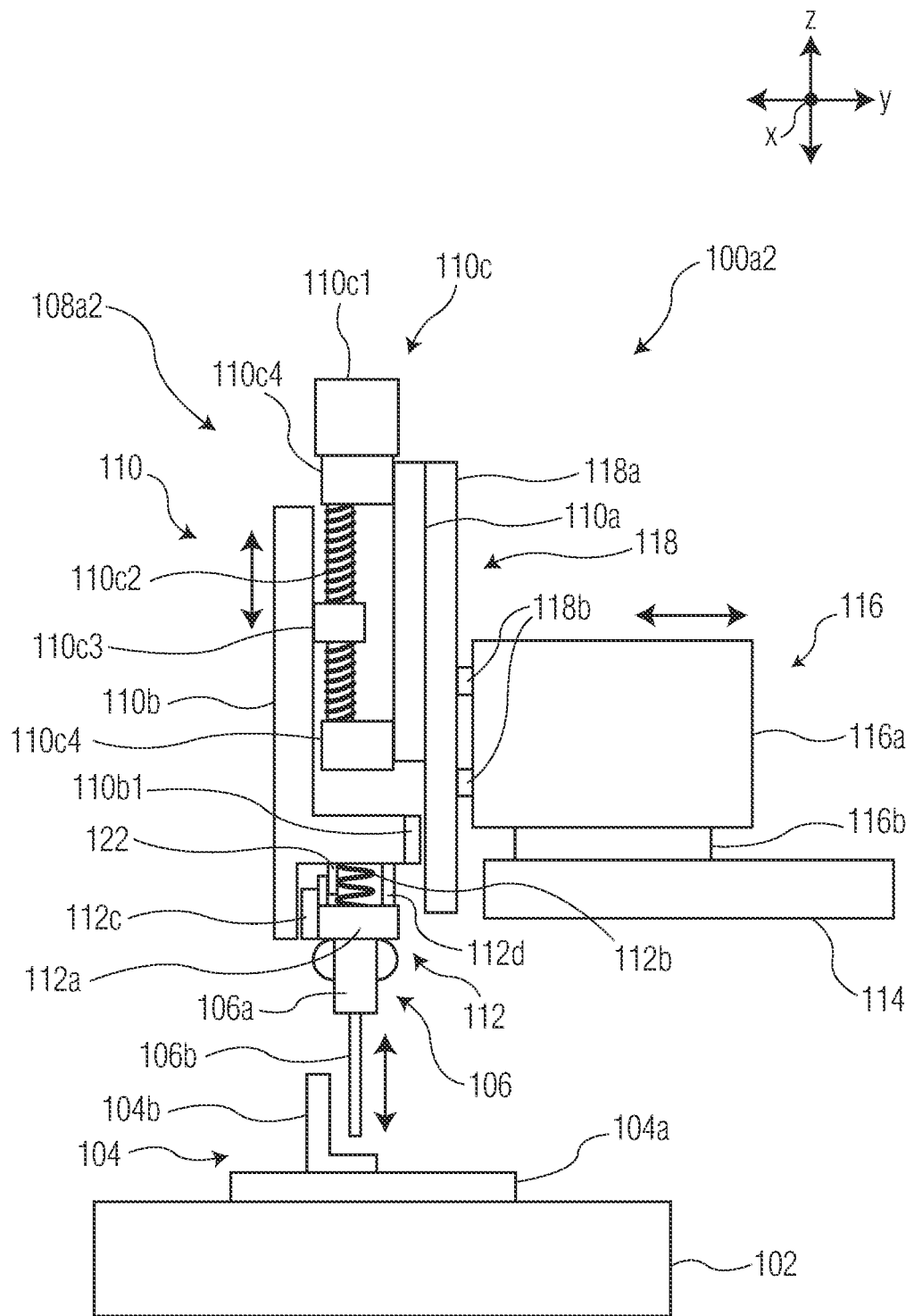
FIG. 5 is a block diagram side view of yet another ultrasonic welding system in accordance with an exemplary embodiment of the invention.

FIG. 5 illustrates an ultrasonic welding system 100*a*2. Ultrasonic welding system 100*a*2 is substantially similar to ultrasonic welding system 100*a* (illustrated and described with respect to FIG. 1A), and includes a number of identical components/elements as compared to ultrasonic welding system 100*a*. Thus, certain details of such components/elements are not repeated with respect to FIG. 5.

Ultrasonic welding system 100*a*2 (of FIG. 5) differs from ultrasonic welding system 100*a* (of FIG. 1A) in that z-axis motion system 108*a*2 (of FIG. 5) includes a secondary z-axis forcer 122 (e.g., a pneumatic cylinder 122 or other forcer) carried by moveable portion 110*b* of z-axis forcer 110. In FIG. 5, secondary z-axis forcer 122 provides a variable force along the z-axis of ultrasonic welding system 100*a*2.

FIGS. 6A-6D illustrate an exemplary operation of an ultrasonic welding system in accordance with certain exemplary embodiments of the present invention. The operation illustrated in FIGS. 6A-6D is shown and described with respect to ultrasonic welding system 300*a* (from FIG. 3A). However, it is understood that the operation of FIGS. 6A-6D is equally applicable to any of the ultrasonic welding systems illustrated and described herein (e.g., ultrasonic welding system 100*a*, 100*b*, 200*a*, 200*b*, 300*a*, 300*b*, 100*a*1, 100*a*2), or any other ultrasonic welding system within the scope of the invention.

Figure 6A:
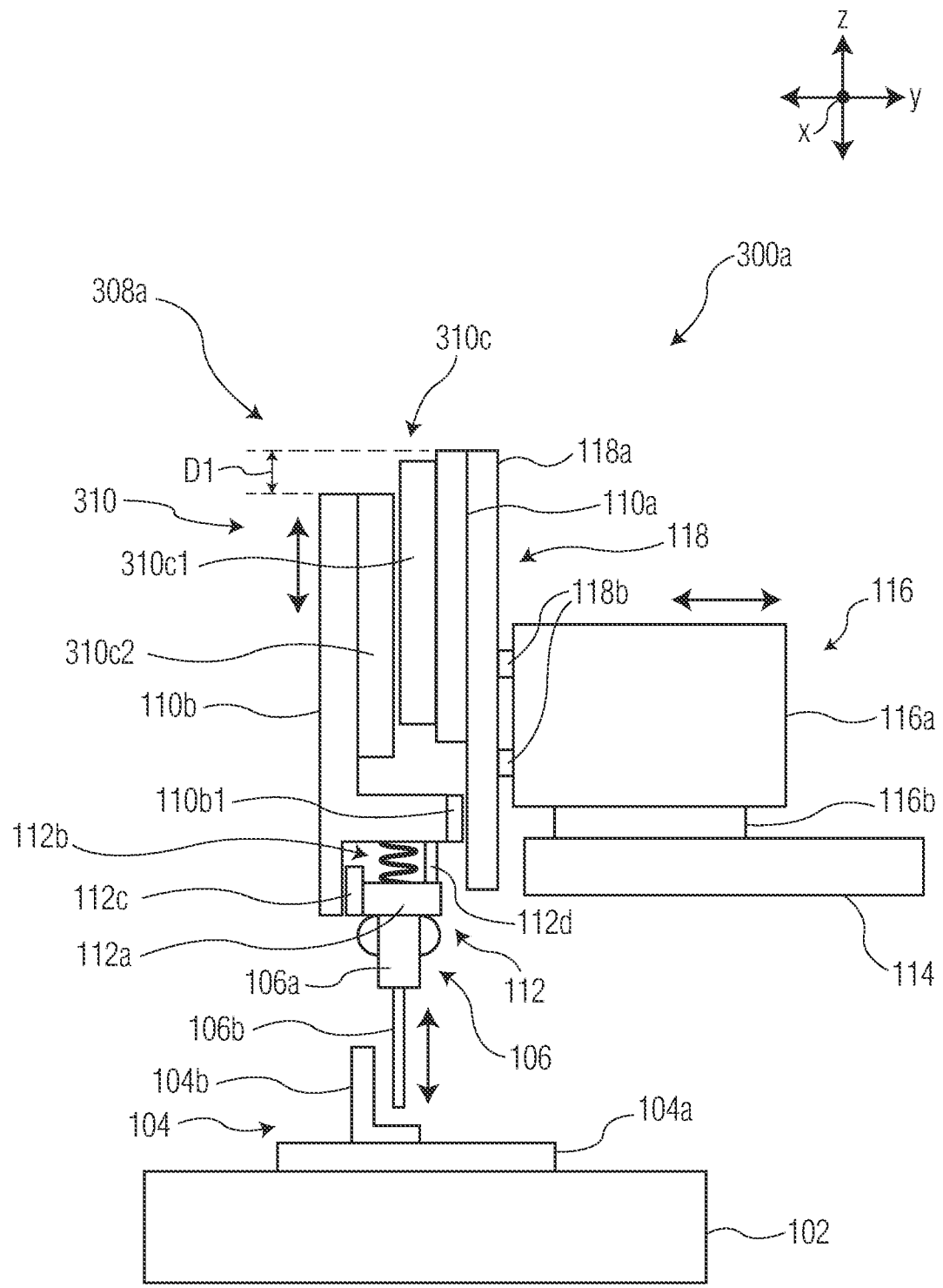
FIGS. 6A-6D are block diagram side views of the ultrasonic welding system of FIG. 3A illustrating a method of ultrasonically welding a conductive terminal to a workpiece in accordance with an exemplary embodiment of the invention.

Referring now to FIG. 6A, workpiece 104 is supported on support structure 102 of ultrasonic welding system 300*a*. Workpiece 104 includes conductive terminal 104*b* aligned with a conductive region of substrate 104*a* of workpiece 104. At FIG. 6A, weld head assembly 106 (including ultrasonic converter 106*a* carrying sonotrode 106*b*) is positioned above workpiece 104 prior to the ultrasonic welding of conductive terminal 104*b* to a conductive region of substrate 104*a*. Weld head assembly 106 is configured for motion along the z-axis of ultrasonic welding system 300*a* using z-axis forcer 310 of a z-axis motion system 308*a*. At FIG. 6B, weld head assembly 106 has been moved downward (through motion of moveable portion 110*b* of z-axis motion system 308*a*, where moveable portion 110*b* carries weld head assembly 106), along the z-axis, using z-axis forcer 310 such that a welding tip of sonotrode 106*b* is in contact with conductive terminal 104*b*. At FIG. 6C, moveable portion 110*b* of the z-axis forcer 310 is moved further downward along the z-axis to activate z-axis overtravel mechanism 112. That is, inline spring 112*b* of z-axis overtravel mechanism 112 is compressed in FIG. 6C. In this position, with the desired level of bonding force now applied to conductive terminal 104*b* via sonotrode 106*b*, ultrasonic energy is applied to the welding tip of sonotrode 106*b* to weld conductive terminal 104*b* to the conductive region of substrate 104*a* of workpiece 104. After the ultrasonic welding operation is complete, moveable portion 110*b* is raised such that sonotrode 106*b* is no longer in contact with conductive terminal 104*b*.

Figure 6B:
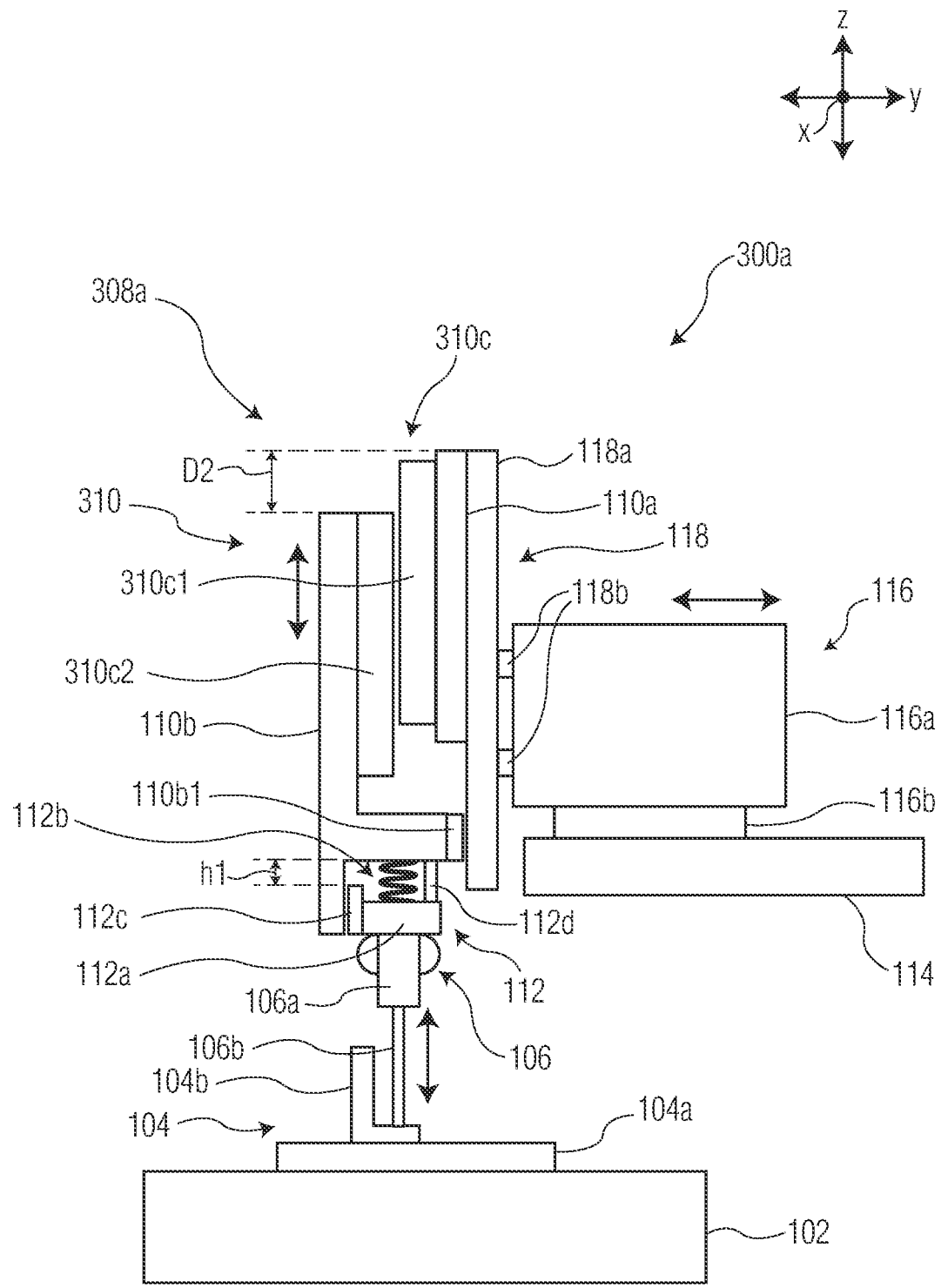
Figure 6C:
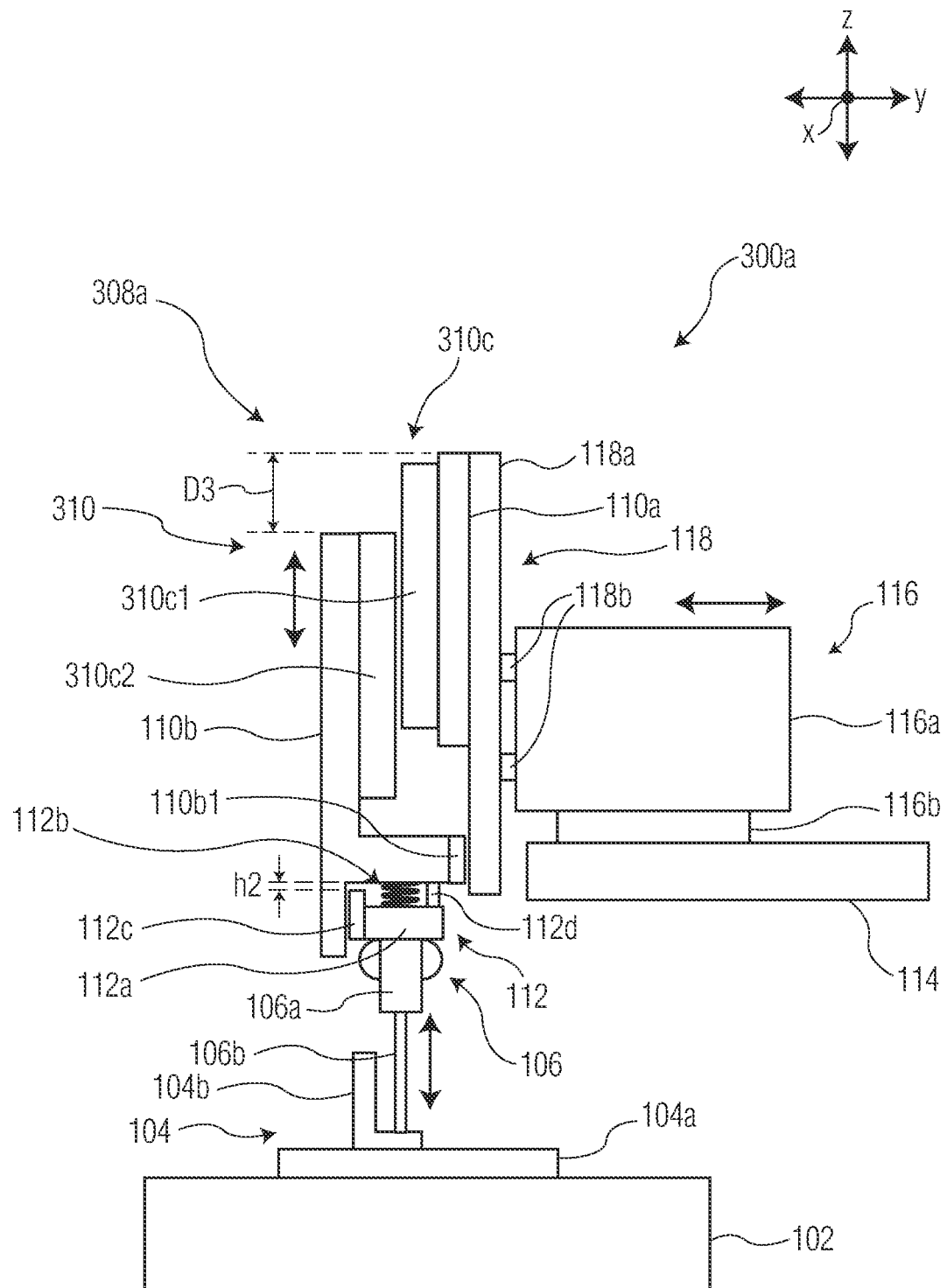
Figure 6D:
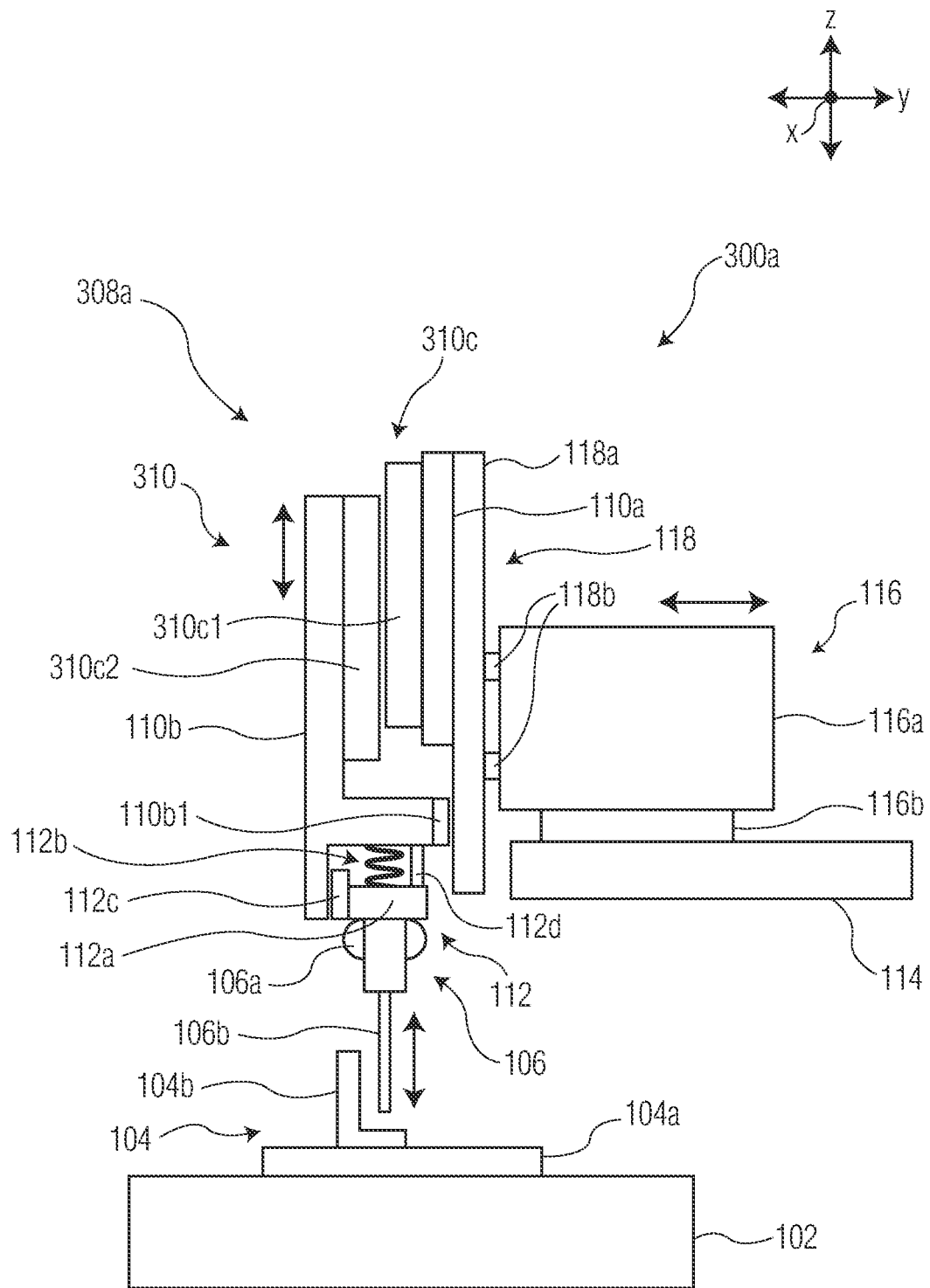

To illustrate the movement of (i) moveable portion 110*b* of z-axis motion system 308*a* with respect to (ii) stationary portion 110*a* of z-axis motion system 308*a*, FIGS. 6A-6C include markings D1, D2, and D3. These markings, the corresponding heights/distances, and the relative components/elements used to delineate these markings are selected somewhat arbitrarily. But the markings illustrate the important point of relative motion. In FIG. 6A, a height difference "D1" is provided between an upper edge of stationary portion 110*a* and moveable portion 110*b*. In FIG. 6B, after lowering moveable portion 110*b* downward such that the welding tip of sonotrode 106*b* is in contact with conductive terminal 104*b*, this height difference has increased to "D2". In FIG. 6C, after further lowering of moveable portion 110*b* downward to activate z-axis overtravel mechanism 112 (thereby compressing inline spring 112*b*), this height difference has further increased to "D3". Between FIGS. 6B and 6C, another variable height is shown (i.e., the height between a lower surface of moveable portion 110*b* and overtravel encoder 112*c*) corresponding to the spring gap. More specifically, in FIG. 6B, this height/gap is shown as "h1", but in FIG. 6C due to the further lowering of moveable portion 110*b* (and the corresponding spring compression of inline spring 112*b*) this height/gap has been reduced to "h2".

According to certain exemplary embodiments of the invention, during the ultrasonic welding operations, exemplary technical specifications include: (i) the sonotrode being configured to operate at a bond force of between 5-500 kg, or the sonotrode being configured to operate at a bond force of between 5-300 kg, or the sonotrode being configured to operate at a bond force of between 5-100 kg; (ii) the sonotrode tip motion amplitude being between 5-150 microns, or the sonotrode tip motion amplitude being between 5-120 microns, or the sonotrode tip motion amplitude being between 5-100 microns; (iii) the sonotrode being configured to form an ultrasonic weld between a first portion of a workpiece and a second portion of a workpiece having an area in a range between 1.5-30 $mm^2$; or the sonotrode being configured to form an ultrasonic weld between a first portion of a workpiece and a second portion of a workpiece having an area in a range between 1.5-30 $mm^2$; or the sonotrode being configured to form an ultrasonic weld between a first portion of a workpiece and a second portion of a workpiece having an area in a range between 1.5-16 $mm^2$; and (iv) the sonotrode being configured to operate at a frequency in a range between 15-40 kHz, or the sonotrode being configured to operate at a frequency in a range between 20-35 kHz, or the sonotrode being configured to operate at a frequency in a range between 20-30 kHz. Exemplary thicknesses of the conductive contact of the contact element (the part of the workpiece being contacted by the sonotrode) include: between 0.2-3 mm; 0.2-1.5 mm, and 0.2-1.2 mm.

In contrast to conventional wire or ribbon bonding machines (which utilize a continuous supply of wire such as from a spool), ultrasonic welding machines typically are used to weld a first portion of a workpiece (e.g., a conductive terminal) to a second portion of the workpiece. For example, the conductive terminal is a distinct piece of material (as opposed to a portion of a wire on a spool), and the terminal may be presented with (and/or aligned with) the second portion of the workpiece prior to being received at the welding area (e.g., the area below the weld head assembly).

Various types of workpieces may be welded using the ultrasonic welding systems illustrated and described herein (or other systems with the scope of the invention). Such workpieces may include a first portion of the workpiece (e.g., conductive terminal 104b illustrated and described herein) configured to be welded to a second portion of the workpiece (e.g., a conductive region of substrate 104a illustrated and described herein). Such workpieces may be particularly applicable to power modules. Of course, any other types of workpieces may be welded in accordance with the invention.

Exemplary conductive terminals may be copper terminals, terminals included as part of a copper busbars, or any other conductive terminals configured for use in the desired application. Exemplary substrates include a DBC (Direct Bonded Copper) assembly, copper plates, copper strips, or any other substrate configured for use in the desired application.

It will be appreciated that the term "power module" (sometimes referred to as a power electronic module), as used herein, relates to a module for containing one or more power components (e.g., power semiconductor devices). Example power components include MOSFETs, IGBTs, BJTs, thyristors, GTPs, and JFETs. Such a module also typically includes a power electronic substrate for carrying the power components. As compared to discrete power semiconductors, power modules tend to provide a higher power density.

The ultrasonic welding operations described herein may utilize (i) linear ultrasonic motion, (ii) torsional ultrasonic motion, (iii) a combination of linear and torsional ultrasonic motion, and (iv) other types of ultrasonic motion.

While not detailed herein, theta motion is contemplated as an option in connection with ultrasonic welding systems. As described herein, the weld head assembly may be moved along an x-axis, a y-axis, and/or a z-axis. But additional motion may be provided about a theta axis. A theta motion system may be provided for the weld head assembly only, or the theta motion system may also carry certain elements of the z-axis motion system, etc.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An ultrasonic welding system comprising:
   a support structure for supporting a workpiece;
   a weld head assembly including an ultrasonic converter carrying a sonotrode;
   a z-axis motion system carrying the weld head assembly, the z-axis motion system including (i) a z-axis forcer for moving the weld head assembly along a z-axis of the ultrasonic welding system, and (ii) a z-axis overtravel mechanism disposed between the z-axis forcer and the weld head assembly;
   a z-axis encoder for sensing motion of (i) a moveable portion of the z-axis forcer with respect to (ii) a stationary portion of the z-axis forcer along the z-axis of the ultrasonic welding system; and
   an overtravel encoder for sensing motion of (i) the moveable portion of the z-axis forcer with respect to (ii) the weld head assembly along the z-axis of the ultrasonic welding system.

2. The ultrasonic welding system of claim 1 wherein the z-axis forcer includes a linear motor for moving the weld head assembly along the z-axis of the ultrasonic welding system.

3. The ultrasonic welding system of claim 1 wherein the z-axis forcer includes a ball screw system for moving the weld head assembly along the z-axis of the ultrasonic welding system.

4. The ultrasonic welding system of claim 1 wherein the z-axis forcer includes a pneumatic cylinder for moving the weld head assembly along the z-axis of the ultrasonic welding system.

5. The ultrasonic welding system of claim 1 wherein the z-axis overtravel mechanism includes an inline spring.

6. The ultrasonic welding system of claim 1 wherein the z-axis overtravel mechanism includes a pneumatic cylinder.

7. The ultrasonic welding system of claim 6 wherein the pneumatic cylinder is a secondary z-axis forcer providing a variable force along the z-axis of the ultrasonic welding system.

8. The ultrasonic welding system of claim 1 further comprising an x-axis motion system for moving the weld head assembly along an x-axis of the ultrasonic welding system, and a y-axis motion system for moving the weld head assembly along a y-axis of the ultrasonic welding system, wherein one of the x-axis motion system and the y-axis motion system carries the other of the x-axis motion system and the y-axis motion system.

9. The ultrasonic welding system of claim 8 wherein the z-axis motion system is carried by the x-axis motion system and the y-axis motion system.

10. The ultrasonic welding system of claim 1 further comprising a secondary z-axis forcer carried by a moveable portion of the z-axis forcer, the secondary z-axis forcer providing a variable force along the z-axis of the ultrasonic welding system.

11. The ultrasonic welding system of claim 1 further comprising a force detection mechanism for detecting a z-axis force applied by the ultrasonic welding system along the z-axis of the ultrasonic welding system.

12. The ultrasonic welding system of claim 1 wherein the sonotrode is configured to operate during a welding operation at a bond force of between 5-500 kg, and with a sonotrode tip motion amplitude of between 5-150 microns.

13. The ultrasonic welding system of claim 1 wherein the sonotrode is configured to weld a first portion of the workpiece to a second portion of the workpiece using at least one of linear ultrasonic motion and torsional ultrasonic motion.

14. The ultrasonic welding system of claim 1 further comprising an input workpiece supply for providing the workpiece, and a material handling system for moving the workpiece from the input workpiece supply to the support structure.

15. The ultrasonic welding system of claim 1 wherein the workpiece is selected from the group consisting of a power module, a lead frame and a battery module.

16. The ultrasonic welding system of claim 1 wherein the workpiece includes a terminal, wherein the sonotrode is configured to ultrasonically weld the terminal to another portion of the workpiece.

17. The ultrasonic welding system of claim 1 further comprising a workpiece clamping system for clamping the workpiece to the support structure during ultrasonic welding by the sonotrode.

18. The ultrasonic welding system of claim 1 further comprising a workpiece assembly station configured to assemble the workpiece before ultrasonic welding of the workpiece by the sonotrode, the workpiece assembly station being configured to align a terminal of the workpiece with another portion of the workpiece.

19. The ultrasonic welding system of claim 1 wherein the sonotrode is configured to form an ultrasonic weld between a terminal of the workpiece and another portion of the workpiece having an area in a range between 1.5-30 mm$^2$.

20. The ultrasonic welding system of claim 1 wherein the sonotrode is configured to operate at a frequency in a range between 15-40 kHz.

21. An ultrasonic welding system comprising:

a support structure for supporting a workpiece;

a weld head assembly including an ultrasonic converter carrying a sonotrode;

a z-axis motion system carrying the weld head assembly, the z-axis motion system including (i) a z-axis forcer for moving the weld head assembly along a z-axis of the ultrasonic welding system, the z-axis forcer including a ball screw system for moving the weld head assembly along the z-axis of the ultrasonic welding system, and (ii) a z-axis overtravel mechanism disposed between the z-axis forcer and the weld head assembly, the z-axis overtravel mechanism including an inline spring;

a z-axis encoder for sensing motion of (i) a moveable portion of the z-axis forcer with respect to (ii) a stationary portion of the z-axis forcer along the z-axis of the ultrasonic welding system; and an overtravel encoder for sensing motion of (i) the moveable portion of the z-axis forcer with respect to (ii) the weld head assembly along the z-axis of the ultrasonic welding system.

* * * * *